May 14, 1940. H. F. FLOWERS 2,200,271
DUMP VEHICLE
Filed July 21, 1937 6 Sheets-Sheet 1

Inventor
Henry Fort Flowers
By Mason & Porter
Attorneys

May 14, 1940.  H. F. FLOWERS  2,200,271
DUMP VEHICLE
Filed July 21, 1937    6 Sheets-Sheet 5

May 14, 1940.　　　H. F. FLOWERS　　　2,200,271
DUMP VEHICLE
Filed July 21, 1937　　　6 Sheets-Sheet 6

Fig. 7.

Inventor
Henry Fort Flowers
By Mason & Porter
Attorneys

Patented May 14, 1940

2,200,271

UNITED STATES PATENT OFFICE 2,200,271

DUMP VEHICLE

Henry Fort Flowers, Findlay, Ohio

Application July 21, 1937, Serial No. 154,891

12 Claims. (Cl. 105—276)

The invention relates to new and useful improvements in a dump vehicle, that is, a vehicle wherein the body is mounted on the underframe so that it may be selectively tilted to either side for dumping the contents thereof.

An object of the invention is to provide a door controlling mechanism which includes main controlling devices and auxiliary controlling devices, wherein the auxiliary controlling devices operate to aid in holding the doors closed during loading and transport, and in controlling the opening and closing of the door at the dumping side.

A further object of the invention is to provide a door controlling mechanism of the above type which positively controls the opening and closing of the door, wherein said controlling mechanism is so constructed that the doors move to full open position before the body has completed its tilting movement.

A still further object of the invention is to provide a door controlling mechanism of the above type which is so constructed that the door, if it strikes an obstruction, can move toward closed position while the body continues its tilting movement.

A still further object of the invention is to provide a door controlling mechanism of the above type which includes cushioning springs operating to hold the doors in closed position so as to prevent breaking of parts when the door strikes an obstruction in its closing movement.

A still further object of the invention is to provide a door controlling mechanism of the above type wherein the body is supported on said underframe so that it may be lifted therefrom, and wherein means is provided for preventing lateral movement of the body during transport and also for preventing the body from being lifted from its support when the door strikes an obstruction during opening.

These and other objects will in part be obvious and will in part be hereinafter more fully disclosed.

In the drawings which show by way of illustration one embodiment of the invention—

Fig. 3 is a longitudinal sectional view through the body and underframe, said section being taken at one side of the bolster and the main door controlling mechanism, and showing at the right, an obstruction preventing the closing of the door;

The invention is directed to a dump vehicle wherein the body is supported on an underframe so that it may be selectively tilted to either side for dumping. The underframe includes a center beam mounted on trucks, both of which are of the usual construction. Adjacent the ends of the center beam are transversely extending bolsters. The body is supported so as to tilt about fulcrums on the bolsters. Intermediate the bolsters are transversely extending supporting brackets for the power cylinders. These brackets also serve as a body support, said body having rockers which engage plates on the supports for the power cylinders. The body is provided with down-folding doors. At each bolster are main door controlling mechanisms for each door which are so constructed as to hold the doors closed during loading and during transport. Said main controlling mechanisms also control the opening and closing of the door at the dumping side, and hold the door closed at the elevated side. Associated with the main door controlling mechanisms are auxiliary door controlling mechanisms. There is an auxiliary door controlling mechanism at each support for the power cylinders, and these auxiliary door controlling mechanisms operate to hold the doors closed during loading and during transport and they also operate to aid in the opening and closing of the door at the dumping side. Each door controlling mechanism includes means whereby the body may continue its tilting movement after the door is fully opened, and at the same time the door is positively controlled in its opening and closing movement. Each door controlling mechanism also includes means whereby the doors are yieldingly pressed into closed position so as to prevent the breaking of parts in case there is an obstruction to the full closing of the door.

It is believed the invention will be better understood by a detail description of the illustrated embodiment thereof. The body consists of cross beams 1 on which is mounted a floor plate 2. At the ends of the body are end members 3 which may be mounted in any suitable way. Mounted at each side of the body is a down-folding door, which doors are indicated at 4 and 5, respectively.

Figure 1:
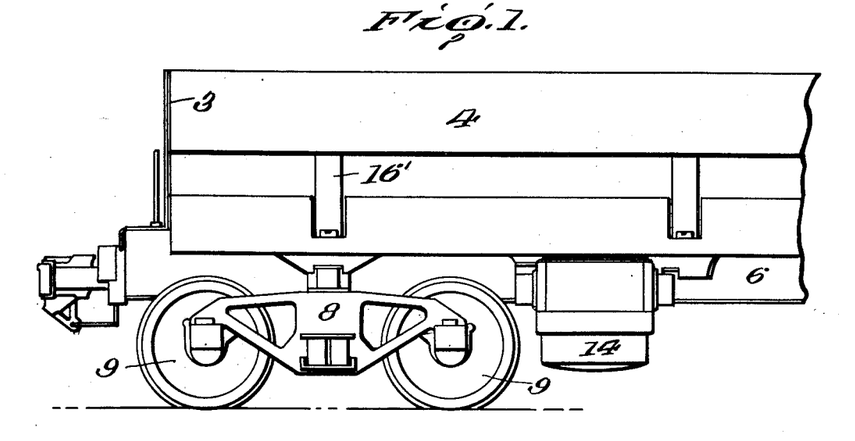
Figure 1 is a side view of a portion of the vehicle embodying the improvements.
Figure 2:
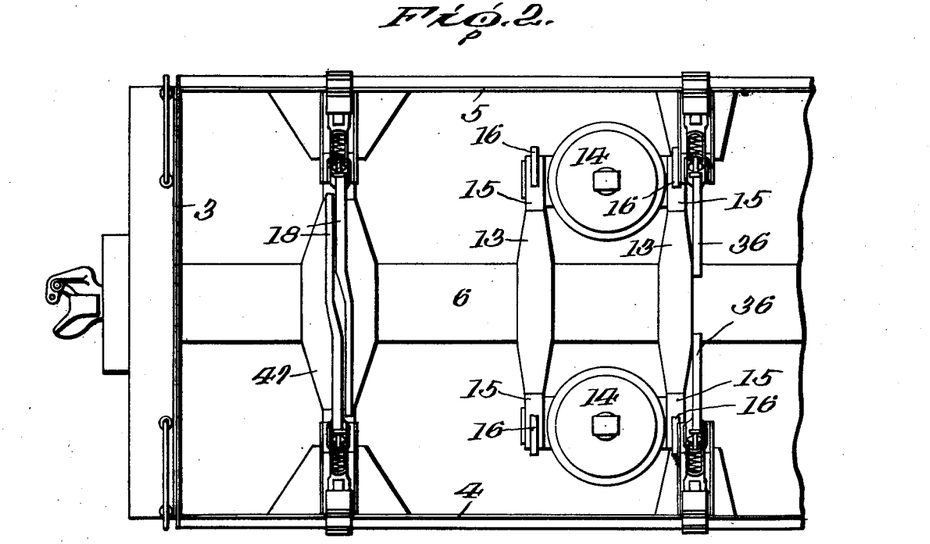
Fig. 2 is a view in plan showing more or less diagrammatically the tilting body frame with the door plate, floor plate and floor panels removed.

The underframe on which the body is mounted consists of a center beam 6 which is of the usual construction. Said center beams 6 is provided with laterally projecting members 7, 7 which may be formed of steel plates, stamped members or in any suitable way. These members 7, 7 constitute the bolster on which the body is mounted, so that it can be tilted selectively about fulcrums at opposite sides of the underframe. The underframe is in turn supported on a truck bolster carrying truck frames, one of which is indicated at 8 in Figure 1. The truck frame is mounted on wheels 9, 9 which, as indicated, are intended to travel on rails, but it is understood that the wheels and underframe support carried thereby may be of any desired construction.

Depending from the floor beams at each side of the body are body supporting plates 10 which are connected by a pin 11. These pins 11 serve as the fulcrum pins on which the body tilts during dumping. The members 7 forming the bolster are provided with U-shaped recesses 12 which serve as fulcrum supports for the body when the body is tilted, and also which serve as supports for the body during loading and transport.

Figures 6, 8:
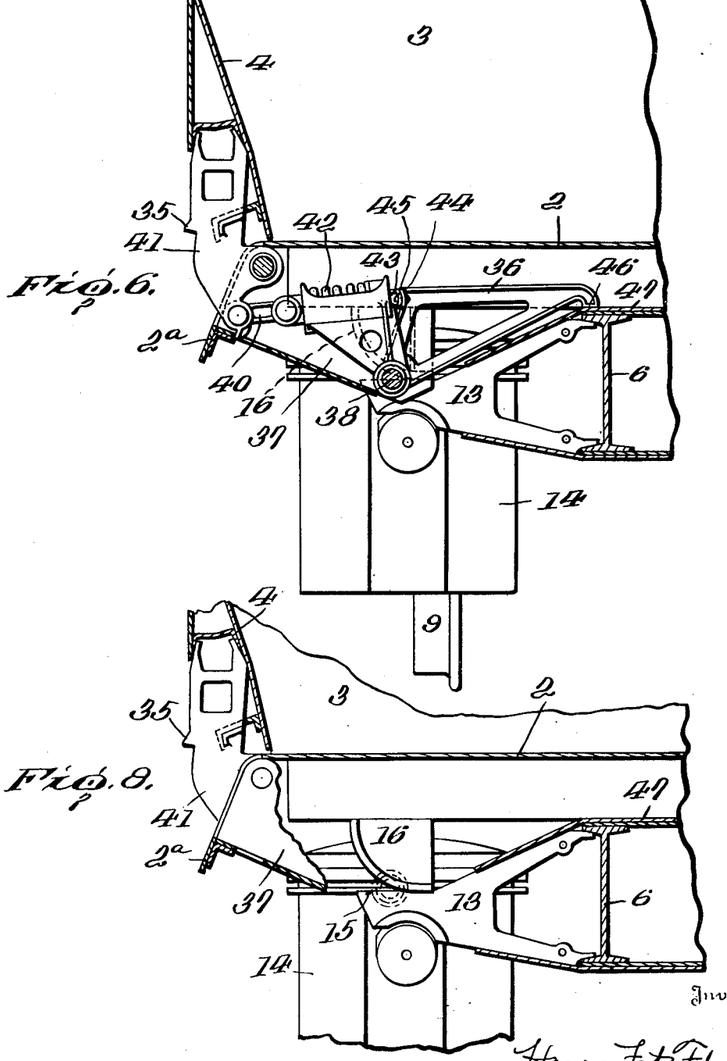
Fig. 6 is a transverse sectional view through the underframe and the body taken on a line at one side of the auxiliary door controlling mechanism.
Fig. 8 is a transverse sectional view at one side of the power lifting devices and showing the shifting fulcrum support for the body.
Figure 7:
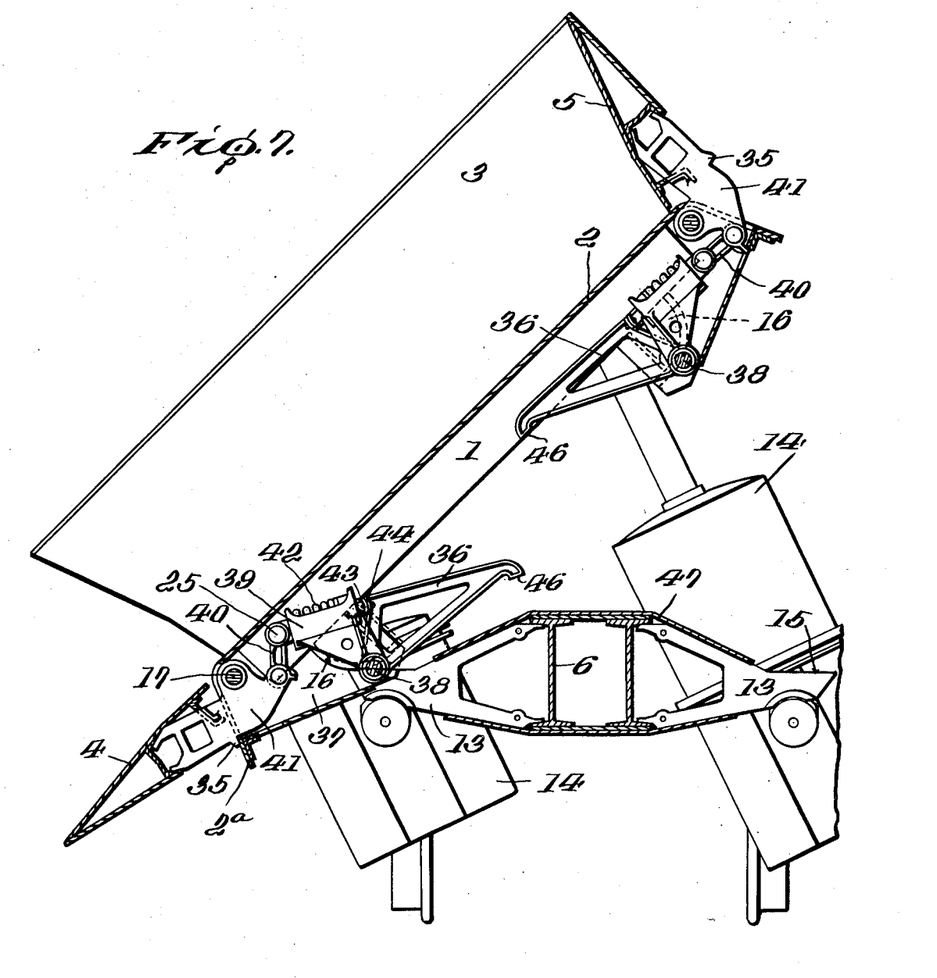
Fig. 7 is a view similar to Figure 6, but showing the body tilted and both auxiliary door controlling mechanisms.
Figure 9:
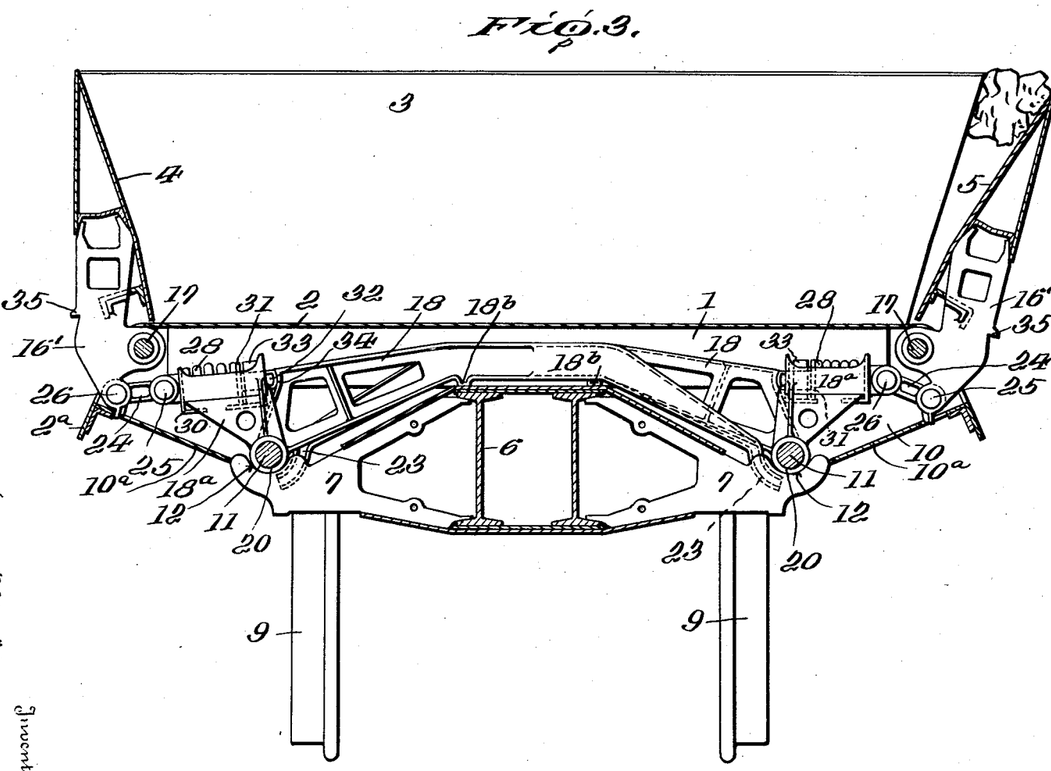

Projecting laterally from the center beam 6 are power cylinder supporting members 13, 13. These members may be constructed in any suitable way and carry trunnion supports for the power cylinders 14, 14. There are power cylinders at each side of the underframe, and these power cylinders are provided with the usual lifting pistons which are in turn connected to the body so that the body may be raised selectively at one side or the other for positioning the body so as to dump the contents thereof. The power cylinders and the manner of mounting and operating the same form no part of the present invention. The supporting members 13 for the power cylinders also serve as body supports. The upper face 15 of the supporting member 13 is substantially horizontal. There is a horizontal supporting surface 15 at each side of the underframe and the body is provided with rockers 16 which cooperate, respectively, with these horizontal surfaces 15 on the support for the power cylinders. The horizontal surface 15 as shown at the left in Figure 7, is disposed so that it lies in a plane containing the center line of the fulcrum pins. In Figure 6 of the drawings, the body is shown in righted position, and the rocker bears on the surface 15 at a point well inside of the line containing the center of the fulcrum pins. When the body is moved to tilted position, then the rocker rests on the horizontal surface 15 at a point outside of the line containing the center of the fulcrum pins. There are a number of advantages obtained by the use of these rockers in combination with the fulcrum pins. There is sufficient deflection in the parts to permit the rockers to move with pure rolling motion from the normal position for loading to dumping position. There are rockers at each side of the cylinder and the cylinder trunnions are suspended from the brackets, the tops of which serve as supports for the rockers. When air is admitted to the cylinder to lift the body on one side, the torsional deflection of the underframe and the deflection of the body transfers the weight from the bolster pivot trunnions to the rocker trunnions during the first part of the tilting movement, so that there is a pure rolling motion carrying the major part of the load until the body approaches tilted position, at which point the air pressure is reduced. The result is that during the latter part of the stroke, the body bears at the bolster pivot points as well as on the rockers in proportion to the weight of the body over the respective fulcrum points. Furthermore, during the first part of the stroke, less air pressure is required to lift the body than it would if the fulcrum supports adjacent the cylinders were on the same center line as at the bolsters. As the body approaches tilted position, the weight of the load, to a certain extent, is transferred to the door, and therefore, less air is required to tilt the body. The movement of the point of contact of the rocker with the supporting surface therefor has moved out away from the center of the vehicle and tends to retard the dumping movement at the end of the stroke and thus assists the cylinders in cushioning the tilting movement so as to further reduce the shock at the end of the stroke.

The means herein mentioned for supporting the body in rolling contact so that the point of rolling contact is inwardly of the pivotal center of dumping during the first portion of dumping, and outwardly of said center during the last part of the dumping is covered in a divisional case filed April 13, 1940, Serial No. 329,558.

Figures 5, 9:
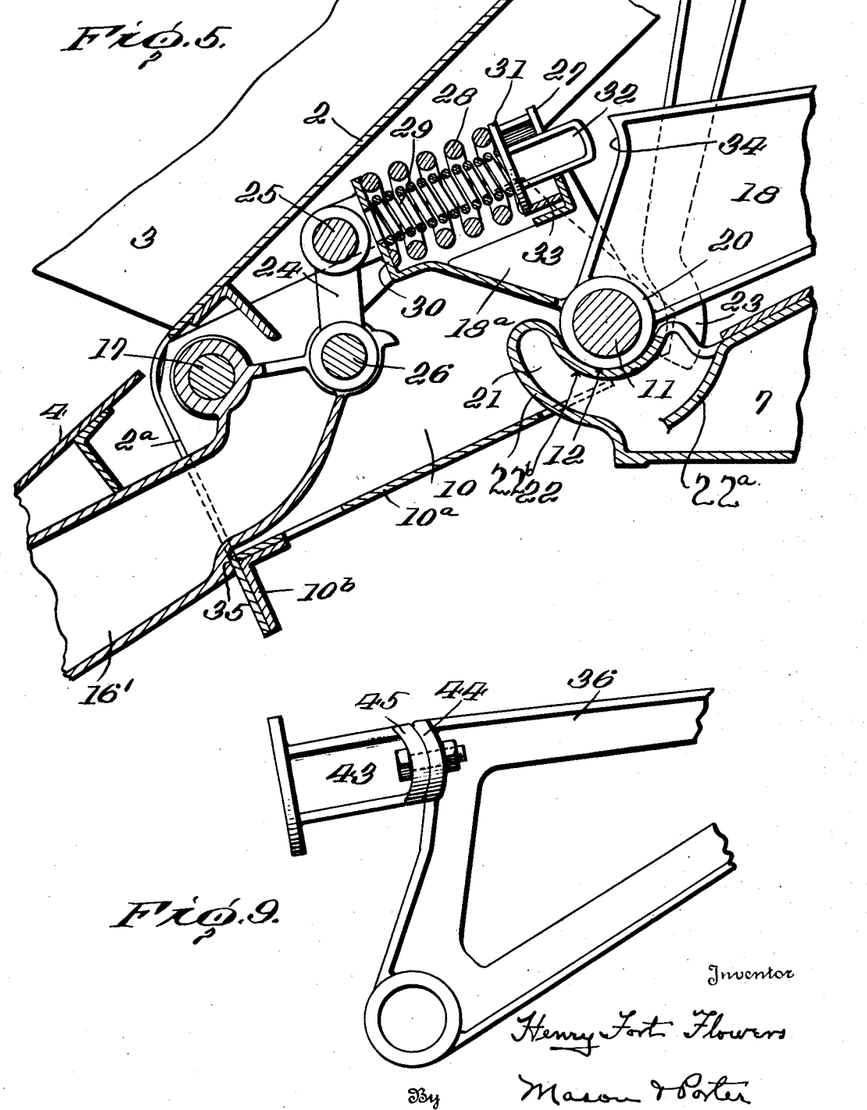
Fig. 5 is an enlarged sectional view showing a portion of the main controlling mechanism with the door in full open position.
Fig. 9 is a detail on an enlarged scale showing the connection between the arms constituting the auxiliary door controlling mechanism.

The floor 2 of the body is provided with a depending skirt 2a which is secured to the depending plates 10. There is a cross plate 10a connecting said plates 10, 10, and an angle bar 10b connecting the skirt and the cross plate 10a. The door is provided with a series of hinge brackets 16', and these hinge brackets are mounted on pivot pins 17 carried by the floor beams. The skirt 2a is slotted to permit the hinge brackets to extend beneath the floor 2. At the bolsters there are independent door controlling devices for each door. These door controlling devices are similar in construction and a detail description of one will answer for the other. Each door controlling device includes an arm 18 which carries a sleeve 20 that surrounds the fulcrum pins 11 between the plates 10, 10. There is an auxiliary arm 18a likewise provided with spaced sleeves 20, 20 which surround the fulcrum pin 11 between the plates 10, 10. These sleeves contact with the fulcrum members 7 and are dimensioned so as to fit therein and constitute the fulcrum trunnions for the body. The body turns about the center of the fulcrum pin when it is tilted. When the body is in normal position for loading and transport, these trunnions at the bolster engage the bolsters and support the body. The arm 18 which is mounted on the trunnion pin at one side of the body extends across and is connected to the underframe at the opposite side of the body. The bolster member 7 is provided with an arcuate-shaped housing 21, the wall 22 of which is curved about the center of the fulcrum pin 11 when the trunnion rests on the bolster. On the opposite side of the housing is a transverse wall 22a cut from the upper wall of the bolster and shaped so that it is substantially parallel with the wall 22. There is also a wall 22b which is the end wall of the bolster, and this likewise is parallel to the wall 22. The end of the arm 18 is curved as indicated at 23, and said curved end extends into this housing and is guided between the wall 22 on one side and the walls 22a and 22b on the other. The upper face is curved to conform to this wall 22 and makes sliding contact therewith when the body is tilted. This maintains the connection between the arm and the underframe. When the body is tilted about the trunnion at one side, the control arm for the door at the other side will move about the center of the trunnion pin 11, as shown in Figure 5 of the drawings. This permits the control arm for the door at the elevated side to remain in a fixed position relative to the body, while the control arm 18 for the door at the dumping side remains in a fixed position relative to the underframe. The advantage of this loose connection between the control arms and the underframe is that it simplifies the construction and prevents the necessity of building a pivot connection with the underframe beyond the end of the body fulcrum pin. The control arm can be very readily connected to the underframe by an endwise movement of the same.

The control arm 18a is connected to the door with which it is associated by means of a link 24. Said link is pivoted at 25 to the auxiliary arm 18a and is pivoted at 26 to the door bracket hinge. Said auxiliary arm 18a is provided with a bracket housing 27 for cushioning springs 28 and 29. The springs 28 and 29 at their outer ends bear against a plate 30 which is formed as a part of the control arm 18a. Mounted for reciprocation in the housing 27 for the spring is a piston head 31 against which the other ends of the springs 28 and 29 bear. The piston head carries a projecting abutment member 32. A limiting collar 33 serves to limit the expansion of the springs. When the body is in normal position for loading and for transport, the projecting abutment 32 contacts with a shoulder 34 on the arm 18, as shown in Figure 3.

When the body is tilted, the control arm 18 for the door at the dumping side remains in a fixed position relative to the underframe, and as the body turns about the center of the trunnion pins, the opening of the door will be positively controlled. Each door hinge has a stop lug 35 which contacts with the depending skirt of the floor plate. This limits the turning movement of the door relative to the body. At this time, the inner face of the door is substantially in alinement with the floor plate. The door controlling mechanism is preferably so constructed that the door will contact with the stop shoulder when the body has been moved through an angle of approximately thirty-five degrees. The door at this time is fully open. The body, however, can continue its tilting movement, for the reason that the control arm 18 can continue to move and the abutment member 32 will move away from the shoulder 34 on the control arm 18, as clearly shown in Figure 5. The advantages of opening the door fully, before the body completes its tilting movement, is that some of the material will slide out at such angle and that the vehicle will be more stable when the door is wide open to permit the free flow of the material as soon as it tends to slip on the floor.

Figure 4:
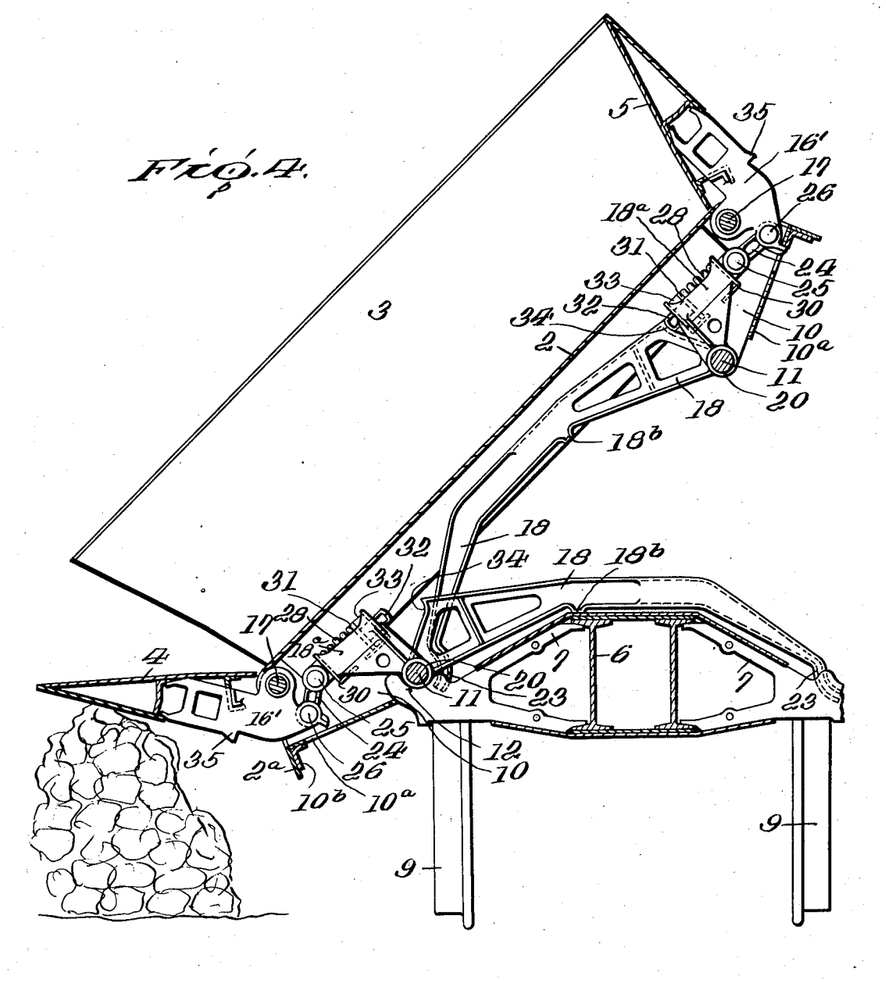
Fig. 4 is a view similar to Fig. 3, but showing the body tilted and the down-folding door as contacting with an obstruction.

It sometimes occurs that during the tilting of the body for dumping, the door strikes an obstruction, as shown, for example, in Figure 4. By the door controlling mechanism just described, the door is free to move toward closed position while the body continues its tilting movement, for the reason that the auxiliary control arm 18a can move away from the main control arm 18, as clearly shown in Figure 4.

When the doors are moved to full closed position, the abutment member 32 is in contact with the shoulder 34 on the main control arm 18. The cushioning springs practically impart a positive closing movement of the door. The control arms are so proportioned, however, that the door will contact with the end members of the body just before the body reaches its normal position for loading and for transport, and the further movement of the body to said normal position will cause the springs to be compressed. This provides a means which insures that the doors will be tightly held closed, and any wear at the pin connections will be taken up through the action of these springs. Furthermore, it sometimes occurs that stones or other material lodge between the door and the end wall, as shown in Figure 3. In such case, the spring will be further compressed and the body will return to its normal position for loading and for transport without the breaking of any of the control members. When the body is tilted for dumping, the plate 10a moves around the end of the bolster member 7, as shown in Figures 4 and 5. The plate will, therefore, prevent the body from being lifted from its fulcrum support when in tilted or near tilted position.

As has been noted above, there are auxiliary door controlling devices in addition to the main door controlling devices which have been described in detail. Much of the mechanism of the auxiliary door controlling devices is similar to that of the main door controlling devices and therefore, only brief description is necessary. Each auxiliary door controlling device includes a control arm 36. Mounted on the door beams are depending body plates 37 carrying a hinge pin 38 on which this control arm 36 is mounted. There is an auxiliary arm 39 associated with each control arm 36 which is likewise mounted on the hinge pin 38. A link 40 connects this auxiliary control arm 39 to the hinge member 41 attached to the door. There are compression springs 42 in the housing carried by the auxiliary arm 39, and a projecting abutment member 43 contacts with a shoulder 44 on the arm 36. The abutment member 43 has laterally projecting lugs 45 which are bolted to lugs carried by the arm 36 so that the auxiliary arm 39 has no movement relative to the arm 36, except through the movement permitted by the closing up of the cushioning springs. The control arm 36 has a lug 46 at its free end which contacts with a plate 47 mounted on the upper face of the center beam 6. When the body is in normal position for loading and transport, as shown in Figure 6, this arm 36 contacts with the underframe, in the manner just described. When the body is tilted for dumping, as indicated in Figure 7, these auxiliary controlling devices aid in controlling the opening of the door until it reaches full open position, at which time the lug 35 on the door hinge strikes the skirt 2a. A further tilting movement of the body lifts the lug 46 from contact with the underframe, as shown in Figure 7. Should the door strike an obstruction during opening, the control arm 36 will move away from the underframe and permit the door to move toward closing position while the body continues to tilt. This auxiliary door controlling mechanism, therefore, functions to aid the main door controlling mechanism in holding the doors closed during loading and during transport. It also functions to aid the main door controlling mechanism in the controlling of the opening and closing of the door at the dumping side. It is ineffective, however, at the side which is elevated, as clearly shown in Figure 7. The main door controlling devices hold the door closed at the elevated side, and the closed door will hold the control arm 36 in a fixed position relative to the body, due to the fact that this control arm is bolted to the abutment 43 associated with the auxiliary control arm 39.

The compression springs of the auxiliary door controlling mechanism will likewise serve to hold the doors tightly closed, taking up all wear in the pivot pins, and will further yield so as to prevent the breaking of parts if the door strikes an obstruction in its final closing movement.

The hinge pins 38 on which the auxiliary control arms are mounted are not fulcrum supports, but they are in alinement with the centers of the fulcrum pins 11. The ends of the bolster member 7 lie between the plates 10, 10 when the body is in normal position for loading and for transport, and prevent any endwise movement of the body on the supporting frame. The control member 18 is provided with a lug 18b which contacts with the plate connected to the underframe. The body beams may be so proportioned as to rest on the center plate of the underframe when the body is in normal loading position so that during loading and during transport, the weight of the body and the load will rest not only on the center beam, but also on the bolsters and the supporting brackets carrying the power cylinders.

From the above it will be apparent that a door controlling mechanism has been provided which operates to hold the doors closed during loading and during transport. The door controlling mechanism also holds the door closed at the elevated side and controls the opening and closing of the door at the dumping side. This control mechanism is so constructed that if the door strikes an obstruction during opening, it can move toward closed position while the body continues to tilt. Furthermore, the controlling mechanism for the doors includes compression springs which operate to hold the doors tightly closed, and which can yield to prevent the breaking of parts in case the door strikes an obstruction to prevent its movement to full closed position.

It is obvious that many changes in the details of construction and the arrangement of parts may be made without departing from the spirit of the invention as set forth in the appended claims.

Having thus described the invention, what I claim as new and desire to secure by Letters Patent, is—

1. In a dump vehicle, an underframe having fulcrum supports at opposite sides thereof, a dump body having trunnions adapted to engage the fulcrum supports, on which trunnions said dump body may be tilted for dumping, a down-folding door at each side of said body, stops for limiting the opening movement of each door, independent door controlling devices for each door including a main control arm pivotally connected to said body at one of said trunnions and adapted to engage the fulcrum support on the underframe at the other trunnion, an auxiliary control arm pivotally connected to said body at the trunnion support, a link connecting said auxiliary arm to the door with which it is associated, said auxiliary arm being adapted to abut against the main arm when the body is in normal position for loading and for transport for holding the doors closed and for controlling the opening and closing of the door when the body is tilted, said auxiliary arm being adapted to move away from said abutment on the main controlling arm when the door is fully opened so as to permit a further tilting movement of the body.

2. In a dump vehicle, an underframe having fulcrum supports at opposite sides thereof, a dump body having trunnions adapted to engage the fulcrum supports, on which trunnions said dump body may be tilted for dumping, a down-folding door at each side of said body, stops for limiting the opening movement of each door, independent door controlling devices for each door including a main control arm pivotally connected to said body at one of said trunnions and adapted to engage the fulcrum support on the underframe at the other trunnion, an auxiliary control arm pivotally connected to said body at the trunnion support, a link connecting said auxiliary arm to the door with which it is associated, said auxiliary arm being adapted to abut against the main arm when the body is in normal position for loading and for transport for holding the doors closed and for controlling the opening and closing of the door when the body is tilted, said auxiliary arm being adapted to move away from said abutment on the main controlling arm when the door is fully opened so as to permit a further tilting movement of the body, said abutment connection between the main arm and the auxiliary arm including cushioning springs which are adapted to yieldingly press the doors against the body when in closed position.

3. In a dump vehicle, an underframe having fulcrum supports at opposite sides thereof, a dump body having trunnions adapted to engage the fulcrum supports, on which trunnions said dump body may be tilted for dumping, a down-folding door at each side of said body, stops for limiting the opening movement of each door, independent door controlling devices for each door including a main control arm pivotally connected to said body at one of said trunnions and adapted to engage the fulcrum support on the underframe at the other trunnion, an auxiliary control arm pivotally connected to said body at the trunnion support, a link connecting said auxiliary arm to the door with which it is associated, a cushioning spring carried by said auxiliary arm, an abutment member engaging said spring and adapted to abut against the main arm when the body is in normal position for loading and for transport and during the opening and closing of the door when the body is tilted.

4. In a dump vehicle, an underframe having fulcrum supports at opposite sides thereof, a dump body having trunnions adapted to engage the fulcrum supports, on which trunnions said dump body may be tilted for dumping, a down-folding door at each side of said body, stops for limiting the opening movement of each door, independent door controlling devices for each door including a main control arm pivotally connected to said body at one of said trunnions and adapted to engage the fulcrum support on the underframe at the other trunnion, an auxiliary control arm pivotally connected to said body at the trunnion support, a link connecting said auxiliary arm to the door with which it is associated, a cushioning spring carried by said auxiliary arm, an abutment member engaging said spring and adapted to abut against the main arm when the body is in normal position for loading and for transport and during the opening and closing of the door when the body is tilted, said abutment member being adapted to move away from the main arm when the door is fully opened so as to permit the further tilting movement of the body and so as to permit a movement of the door toward closed position when it strikes an obstruction during the tilting of the body for dumping.

5. In a dump vehicle, an underframe having fulcrum supports at opposite sides thereof, a dump body having trunnions adapted to engage the fulcrum supports, on which trunnions said dump body may be tilted for dumping, a down-folding door at each side of said body, independent door controlling devices for each door including a control arm pivotally connected to the body at one of its trunnions and adapted to engage a fulcrum support on the underframe at the other trunnion and means cooperating with said control arm for controlling the opening and closing of the door at the dumping side and for holding the door closed at the elevated side, and independent auxiliary door controlling devices for each door including a control arm pivotally connected to said body at one of said trunnions and adapted to engage the underframe adjacent the longitudinal center thereof and means cooperating with said last-named control arm for controlling the opening and closing of the door at the dumping side, both of said door controlling devices operating to hold the doors closed during transport.

6. In a dump vehicle, an underframe having bolster members projecting laterally therefrom, each bolster member having the upper face thereof shaped to provide a recess forming a fulcrum support for the body, a dump body having trunnions adapted to engage the fulcrum supports when the body is tilted, a down-folding door at each side of said body, independent door controlling devices for each door including a main control arm pivotally connected to said body at one of said trunnions, said bolster members being hollow and having an opening therethrough adjacent the body fulcrum support adapted to receive the end of the main control arm whereby said arm may be extended beneath said fulcrum support, the end of said arm being curved to conform to the center of the trunnion when resting on said fulcrum support, and means interposed between said main control arm and the door for positively holding said door closed during loading and during transport and for controlling the opening and closing of the door during dumping.

7. In a dump vehicle, an underframe having bolster members projecting laterally therefrom, each bolster member having the upper face thereof shaped to provide a recess forming a fulcrum support for the body, a dump body having trunnions adapted to engage the fulcrum supports when the body is tilted, a down-folding door at each side of said body, independent door controlling devices for each door including a main control arm pivotally connected to said body at one of said trunnions, said bolster members having an opening therethrough adjacent the body fulcrum support adapted to receive the end of the main control arm, the end of said arm being curved to conform to the center of the trunnion when resting on said fulcrum support, and means interposed between said main control arm and the door for positively holding said door closed during loading and during transport and for controlling the opening and closing of the door during dumping, said main control arm and the devices associated therewith for controlling the door remaining in a fixed position relative to the body at the elevated side for holding the door closed.

8. In a dump vehicle, an underframe having fulcrum supports at opposite sides thereof, a dump body having trunnions adapted to rest and turn on the fulcrum supports when the body is tilted for dumping, a down-folding door at each side of said body, independent door controlling devices for each door, said controlling devices each including means whereby the door may move toward closed position when striking an obstruction while the body continues to tilt, and means carried by the body and adapted to engage beneath the fulcrum supports when the body is in tilted position for preventing the body from being lifted from the fulcrum supports when striking an obstruction.

9. In a dump vehicle, an underframe, a dump body mounted so as to turn about a trunnion support on the underframe for dumping, a down-folding door, a main control arm pivotally connected to the body at said trunnion support and adapted to engage the underframe at the opposite side thereof from said trunnion support, an auxiliary control arm pivotally connected to the body at the trunnion support, a link connecting said auxiliary arm to the door, said auxiliary arm being adapted to abut against the main arm when the body is in normal position for loading and for transport, for holding the door closed and for controlling the opening and closing of the door when the body is tilted, a stop movable with the body and adapted to limit the opening movement of the door, said auxiliary arm being adapted to remain in engagement with the main control arm until the door contacts with said stop and to move away from the abutment on the main controlling arm to permit further tilting movement of the body with the door in open position.

10. In a dump vehicle, an underframe, a dump body mounted so as to turn about a trunnion support on the underframe for dumping, a down-folding door, a main control arm pivotally connected to the body at said trunnion support and adapted to engage the underframe at the opposite side thereof from said trunnion support, an auxiliary control arm pivotally connected to the body at the trunnion support, a link connecting said auxiliary arm to the door, said auxiliary arm being adapted to abut against the main arm when the body is in normal position for loading and for transport, for holding the door closed and for controlling the opening and closing of the door when the body is tilted, a stop movable with the body and adapted to limit the opening movement of the door, said auxiliary arm being adapted to remain in engagement with the main control arm until the door contacts with said stop and to move away from the abutment on the main controlling arm to permit further tilting movement of the body with the door in open position, a cushioning spring carried by said auxiliary arm, and an abutment member carried by the auxiliary arm and supported by said cushioning spring, said abutment member being adapted to engage with the abutment on the main control arm, and said cushioning spring operating to press the door yieldingly to closed position.

11. In a dump vehicle, an underframe having fulcrum supports at opposite sides thereof, a dump body having trunnions adapted to engage the fulcrum supports, on which trunnions the body may be tilted for dumping, a downfolding door at each side of said body, independent door controlling devices for each door including a main control arm pivotally connected to the body at one of said trunnions and adapted to engage the fulcrum support on the underframe at the other trunnion, devices connected to the door and cooperating with said main control arm for controlling the opening and closing of the door during tilting and for holding the door closed at the elevated side, and auxiliary door controlling devices for each door including an auxiliary control arm pivotally connected to the body at one of said trunnions and adapted to engage the underframe adjacent the longitudinal center thereof, and devices connected to the door and cooperating with said auxiliary arm for controlling the opening and closing of the door during the tilting of the body, and for holding the door closed during transport.

12. In a dump vehicle, an underframe having fulcrum supports at opposite sides thereof, a dump body having trunnions adapted to engage the fulcrum supports, on which trunnions said dump body may be tilted for dumping, a downfolding door at each side of said body, stops for limiting the opening movement of each door, independent door controlling devices for each door including a main control arm pivotally connected to said body at one of said trunnions and adapted to engage the fulcrum support on the underframe at the other trunnion, an auxiliary control arm pivotally connected to said body at the trunnion support, a link connecting said auxiliary arm to the door with which it is associated, said auxiliary arm being adapted to abut against the main arm when the body is in normal position for loading and for transport for holding the doors closed and for controlling the opening and closing of the door when the body is tilted, said auxiliary arm being adapted to move away from said abutment on the main controlling arm when the door is fully opened so as to permit a further tilting movement of the body, said pivotal connection between the link and the auxiliary arm being at all times at one side of a line through the pivotal connection of the link to the door and the pivotal connection of the auxiliary arm to the body, said abutment connection between the main arm and the auxiliary arm including cushioning springs adapted to force the pivotal connection between the link and the auxiliary arm toward said line whereby the door is yieldingly pressed against the body when in closed position.

HENRY FORT FLOWERS.